(12) United States Patent
Shirota

(10) Patent No.: US 6,988,097 B2
(45) Date of Patent: Jan. 17, 2006

(54) NEGOTIATION SYSTEM AND METHOD FOR ELECTRONIC COMMERCE

(75) Inventor: Masakazu Shirota, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 10/146,181

(22) Filed: May 15, 2002

(65) Prior Publication Data

US 2002/0178154 A1    Nov. 28, 2002

(30) Foreign Application Priority Data

May 23, 2001  (JP) .............................. 2001-154532

(51) Int. Cl.
*G06F 17/30* (2006.01)
(52) U.S. Cl. .................... 707/3; 707/10; 707/104.1; 709/203; 709/219
(58) Field of Classification Search ................ 707/1–3, 707/10, 104.1; 705/26; 709/203, 219
See application file for complete search history.

(56) References Cited

U.S. PATENT DOCUMENTS 5,710,887 A * 1/1998 Chelliah et al. .............. 705/26
6,615,184 B1 * 9/2003 Hicks ........................... 705/26
2001/0034659 A1 * 10/2001 Kobayashi
2002/0027567 A1 * 3/2002 Niamir
2002/0007986 A1 * 6/2002 Aram
2003/0028443 A1 * 2/2003 Ellis et al.

FOREIGN PATENT DOCUMENTS

| JP | PUPA 2000-057213 | 2/2000 |
| JP | PUPA 2001-076033 | 3/2001 |
| JP | PUPA 2001-101318 | 4/2001 |

* cited by examiner

*Primary Examiner*—Leslie Wong
*Assistant Examiner*—Susan Rayyan
(74) *Attorney, Agent, or Firm*—Schmeiser, Olsen & Watts; William H. Steinberg

(57) ABSTRACT

A search system, an information-providing system and an information search method. "Response information" such as a checkmark for indicating exclusion and a message added by a customer terminal and "additional information" added by a supplier terminal to a commodity retrieved by a search for data in a commodity database of a server based on search criteria input through the customer terminal are associated and stored with "session-specific information" in a session-specific database. When the supplier terminal accesses the server, the "response information" input by the customer terminal is transferred to the supplier terminal. When the customer terminal accesses the server, the "additional information" added by the supplier terminal is transferred to the customer terminal.

16 Claims, 12 Drawing Sheets

FIG. 7

| Supplier B exhibition list | | | | | | | | Input Message | Sold | Access right |
|---|---|---|---|---|---|---|---|---|---|---|
| Maker | Model name | Grade | Model year | Color | Price | Intending purchaser | Message | | | |
| TTTT | ABCD | LTD | 1993 | White | 7500 | - | - | ☐ 421 | ☐ 422 | ☐ 423 |
| HHHH | EFGH | HIJ | 1996 | Black | 8800 | - | - | ☐ | ☐ | ☐ |
| AAAA | PQRS | TUR | 1997 | Red | 23800 | Yes | - | ☐ | ☐ | ☐ |
| AAAA | PQRS | TUR | 1998 | Red | 27000 | Yes | Could you give me a little discount? | ☐ | ☐ | ☐ |
| NNNN | UVW | LMN | 1999 | Yellow | 32800 | Yes | - | ☐ | ☐ | ☐ |

420

NEGOTIATION SYSTEM AND METHOD FOR ELECTRONIC COMMERCE

FIELD OF THE INVENTION

The present invention relates to a search system, information-providing system, and information search method suitable for retrieving information in cases where a user purchases goods, for example.

BACKGROUND

As the Internet has become widespread in recent years, a PC (personal computer) can be used to collect various items of information and purchase goods or services without visiting a store, as is well known.

Examples of such sites provided for collecting information include sites displaying for comparison the selling prices of computer-related products or electric appliances available at a number of stores. A user (customer) who has decided to buy a particular commodity (product model) can use such a site to find a store (supplier) selling the model at the lowest price and purchase it. Services provided by such a site are very useful to the user because he/she can purchase goods at the most advantageous price without actually visiting a number of stores.

The services as described above are useful to a user who has decided to buy a particular model. However, they are not necessarily useful to a user who has not yet decided on any particular model. That is, the user who has decided on the particular product only needs to compare prices, which vary from store to store. On the other hand, the user who has not decided on a particular product yet or wants to decide on a product based on a number of factors besides its price, needs to weigh a large number of items of information against each other, taking a lot of time and effort for the comparison.

For example, if a user wants to buy a used car, it is difficult for the user to decide on a car based on simple comparison of prices even if he/she has chosen a particular model, because different cars of that model have different prices according to their model years and states.

When the user inputs criteria such as a car type, a model year, color, and price range on a site dealing with commodities such as used cars, the site simply extracts information about used cars that meet the input criteria from a database containing data input beforehand by a plurality of dealers and lists the extracted information about the used cars on the personal computer of the user. The user narrows down candidates based on the displayed information about the used cars to ultimately select one or more used cars from the list. Then the user contacts a dealer or dealers selling the selected cars to obtain further information and negotiate with the dealer or dealers about terms of purchase to ultimately purchase a used car.

When the user chooses one or more used cars, he/she uses an e-mail address linked with the site to send e-mail to each dealer or use a telephone number provided on the site to make a phone call each dealer.

In this method, the service provider only provides a service for listing the used cars that meet the criteria specified by the user. The narrowing the list, contact with the dealer, and negotiation with the dealer are practically excluded from the service provided through the Internet. This is much the same as selecting used cars from a list in a used-car magazine and contacting dealers.

Furthermore, if the user cannot find his/her desired used car through the first search, he/she would continually repeat the search at intervals. Because the user would repeat the search using the same criteria, the same used cars previously retrieved would be repeatedly displayed. Thus, time is wasted for viewing the search results, causing the user to find the search cumbersome and eventually leading to a decrease in the number of users of that search service.

The dealer, on the other hand, only displays goods on its site on the Internet and, after being contacted by the customer, the transaction is the same as that of businesses before the introduction of the Internet commerce. Thus, the dealer also does not take full advantage of the use of the Internet.

These problems are not limited to the used-car dealing illustrated above. They are common to sites providing other commodities and services.

SUMMARY

The present invention has been achieved in view of these technical problems and it is an object of the present invention to provide a search system, information-providing system, and information search method that are beneficial to both customers and suppliers.

To attain the-above mentioned and other objects, a server according to the present invention performs a search according to search criteria specified from the terminal of a customer and outputs exhibition information retrieved as a result of the search. The server accepts message information relating to the exhibition information that is input from the terminal of the customer and associates and stores it with information for identifying the customer. The message information may be a request or inquiry provided to an exhibitor. The information for identifying the customer may be a login ID input from the terminal of the customer during a login to the server or a session-specific ID assigned by the server when a session is established between the server and the terminal of a customer. When the server is accessed from the terminal of the exhibitor after the server accepts the message information, the server outputs the message information to the terminal of the exhibitor. Thus, the message can be transferred from the customer to the exhibitor through the server. The customer does not need to prepare a separate document such as an e-mail message for this message transfer. Instead, the customer only needs to input the message in the exhibition information displayed on the terminal of the customer.

When the exhibitor inputs a response message information to the message information received on the terminal of the exhibitor, the server associates and stores the response message information with the information identifying the customer. When the server is accessed subsequently from the terminal of the customer, the server outputs the response message associated with the information identifying the customer to the terminal of the customer. Thus, the response message input on the terminal of the exhibitor can be transferred to the terminal of the customer.

A server according to the present invention assigns unique session-specific information to a session established between the terminal of an information requester and the server when search criteria are specified through the terminal of the information requester. A search execution module searches for information based on the criteria specified through the terminal of the information requester and retrieves information that meets the criteria to output it to the terminal of the information requester. If the server receives additional information added to the information retrieved by the search execution module from at least one of the terminal of the information requester and the terminal of an information provider, the server associates and stores the additional information with the session-specific information. Once the server stores this information, the server obtains the additional information and the information to which the additional information is added from an information storage based on the session-specific information and provides it to the terminal of the information requester or the terminal of the information provider. According to this configuration, if additional information such as a message about the information is added through the terminal of the information requester to which the information is provided, it can be provided to the terminal of the information provider. On the other hand, if additional information is input through the terminal of the information provider in order to remove the information that the provider provided, the additional information can be output to the terminal of the information requester that retrieves the information containing this information. Of course, a message may be input as the additional information through the terminal of the information provider and the message may be output to the terminal of the information requester.

In addition, the server may associate and store search criteria data specified from the terminal of the information requester with a session-specific information. When a session is established between the terminal of the information requester and the server, the server can retrieve information based on the stored search criteria. That is, every time a session is established between them after the storage of the search criteria data, a search is performed based on those search criteria, rather than holding information retrieved on the first search. Thus, information newly added or deleted, or information to which additional information is added by an information provider after the first search is reflected in the result of the searches subsequent to the first search.

In a search system according to the present invention, search information that meets search criteria specified from the terminal of a user is retrieved from a database and output as search result information to the terminal of the user through a network. The search system accepts additional information, such as information indicating the removal of unnecessary information included in the search result information, that is added to the output search result information through the terminal of the user and associates and stores the search criteria with the additional information. When the second and subsequent sessions are established between the terminal of the user and the server, the stored search criteria information and additional information can be retrieved, a search can be performed based on the search criteria to output search result information in which the additional information is reflected, that is, search result information from which unnecessary information is removed, for example.

In an information-providing system according to the present invention, a server retrieves information based on a request sent from the terminal of an external information requester, sends it to the terminal of the information requester, identifies the terminal of an information provider providing the information sent to the terminal of the information requester, and sends information retrieved by information retrieval means to the identified terminal of the information provider. That is, when the information provided from the terminal of the information provider is retrieved based on the request sent from the terminal of the information requester, the information provider can recognize the fact. In addition, if the retrieved information is provided from a plurality of information providers, all the information retrieved is sent to the terminal of the information provider, because, rather than the information provided by the information provider, the information retrieved in accordance with the information requester's request is sent to the terminal of the information provider. Thus, if the information provider provides information about their goods or service, the information provider can negotiate with the information requester based on the knowledge of the information that is provided by other providers and retrieved in accordance with the information requester's request.

In addition, when the server receives the requester's additional information, such as a message or information for selecting information, that is added to information sent to the terminal of the information requester, the server can send the requester's additional information to the terminal of the information provider together with the information. On the other hand, when the server receives the provider's additional information such as a message added to information sent to the information provider's terminal, the server can send the provider's additional information to the information requester's terminal together with the information. Thus, information such as messages can be communicated between the information provider and the information requester.

The present invention may be viewed as an information-providing terminal for providing information to a server through a network, wherein once information provided by the information-providing terminal is retrieved by the server performing a search in accordance with search criteria input from an external source, the retrieved information is received and displayed by the information-providing terminal when the information-providing terminal accesses the server.

An access right can be set for rejecting the disclosure of information provided by the information-providing terminal among the retrieved information to other information-providing terminal.

In an information search method according to the present invention, search criteria data input on the terminal of an information requester is received, information stored in a database is searched to retrieve information that meets the search criteria, and the information is sent to the terminal of the information requester. Additional information added to the sent information by the terminal of the information requester is received, the search criteria is associated with requester identification information for identifying the information requester and stored. When the server is accessed by the terminal of an information provider providing the retrieved information to the database, the retrieved information to which the additional information is added can be sent to the terminal of the information provider.

Once the provider's additional information added to the information sent to the information provider is received, the search criteria associated with requester identification information may be obtained, information stored in the database may be searched based on the search criteria to retrieve information that meets the search criteria, and the retrieved information to which the provider's additional information is added may be sent to the information requester's terminal when the server is accessed by the information requester's terminal and the requester identification information is received.

BRIEF DESCRIPTION OF THE DRAWINGS

FIG. 7 shows an example of a screen displayed on the supplier terminal;

DETAILED DESCRIPTION

The present invention will be described below with respect to an embodiment shown in the accompanying drawings.

Figure 1:
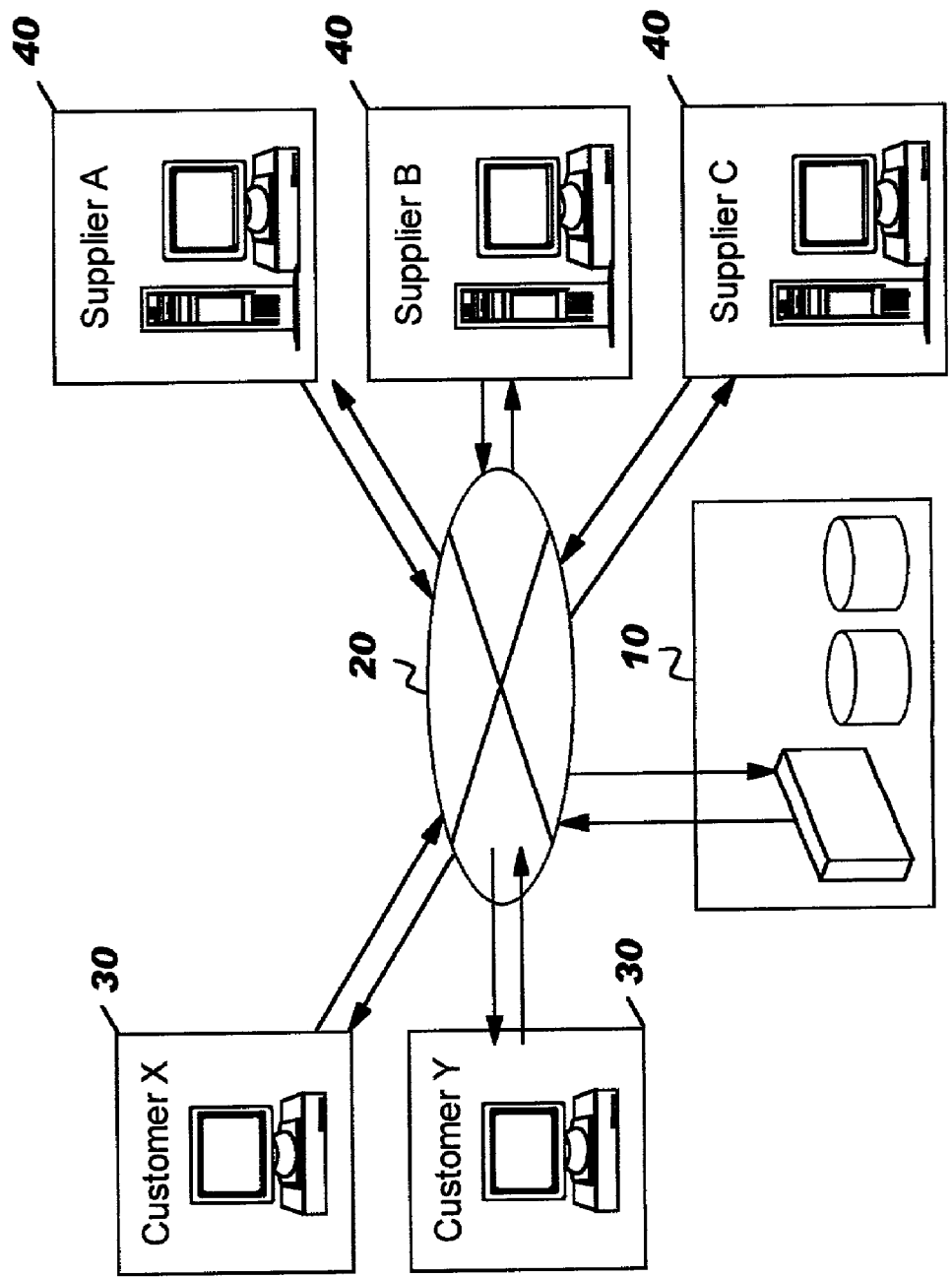
FIG. 1 shows an exemplary configuration of a system according to the invention.

FIG. 1 is a diagram illustrating an exemplary configuration of a used-car search system (information-providing system) according to the invention. As shown in FIG. 1, a server (information search system) 10 of a provider of a used-car search service can be connected to a network 20 such as the Internet. Each of the customers X, Y (hereinafter simply called a customer or customers), who would be a customer for used cars, uses a customer terminal (information requester terminal, user terminal) 30 to access the server 10 over the network 20. Each of the suppliers A, B, C of used cars (hereinafter simply called a supplier or suppliers) uses a supplier terminal (exhibitor terminal, information provider terminal, information-providing terminal) 40 to access the server 10 over the network 20.

Figure 2:
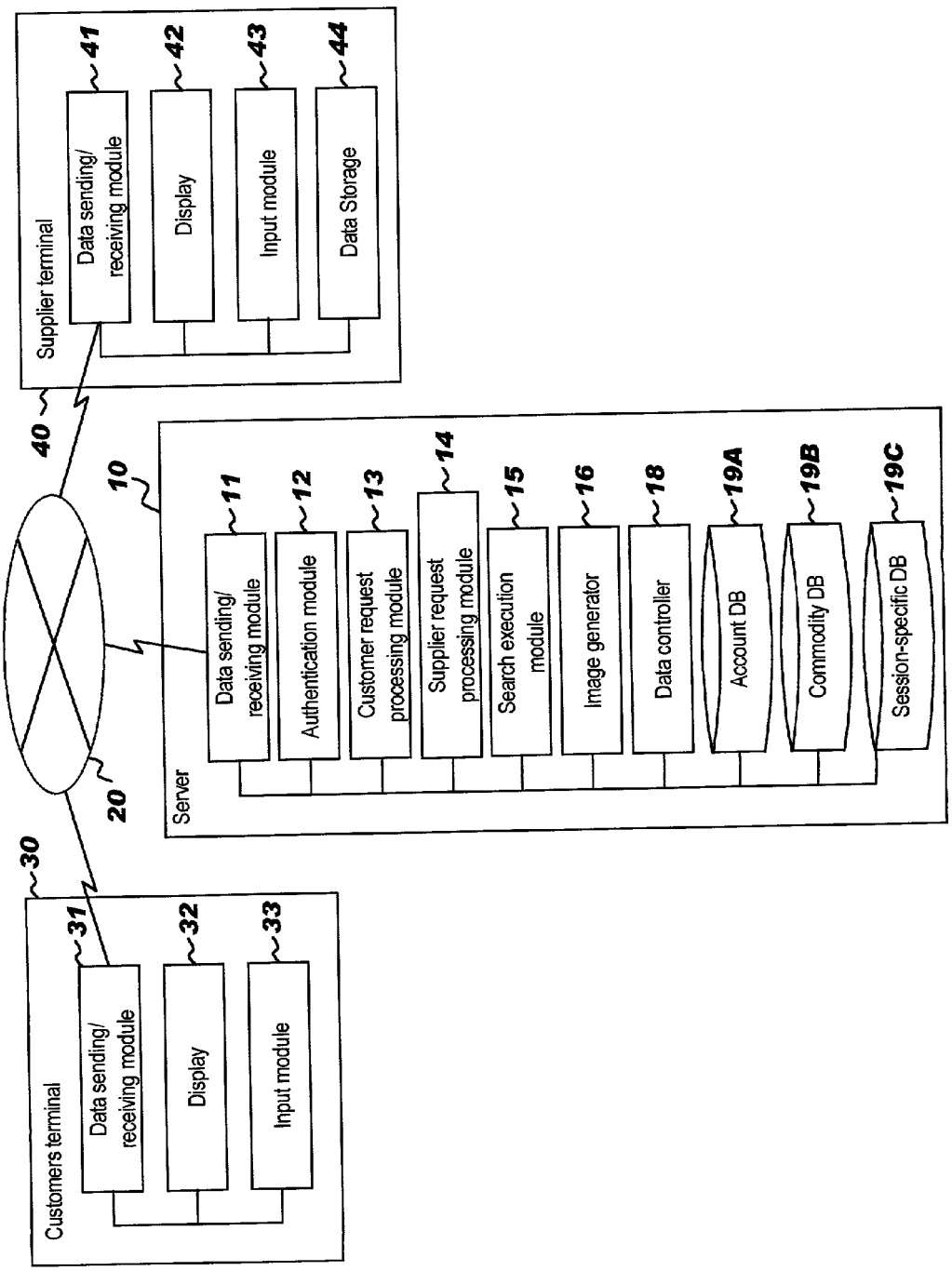
FIG. 2 shows details of a server and terminals that constitute the system.

As shown in FIG. 2, the customer terminal 30, which may be any terminal that allows Internet browsing, comprises a data sending/receiving module 31 for sending and receiving data to and from the server 10 over the network 20, a display 32 such as a monitor for displaying an image, and input module 33 such as a pointing device and a keyboard for selecting or inputting a character string in a predetermined input area displayed on the display 32. Image information according to data in a format such as HTML (Hypertext Markup Language) sent from the server 10 by an application such as a browser application is displayed on the display 32 of the customer terminal 30.

The supplier terminal 40 comprises, as an arrangement for Internet browsing, a data sending and receiving module (information receiving module, information sending module) 41 for sending and receiving data to and from the server 10 over the network 20, a display (information display) 42 such as a monitor for displaying an image, and an input module (information adding module, an access right setting module) 43 such as a pointing device and keyboard for selecting or inputting a character string in a predetermined input area displayed on the display 42. The supplier terminal 40 further comprises a data storage 44 consisting of an HDD or other storage media for string information about articles of commerce held by the supplier and can upload the stored information about the articles to the server 10 through the network 20 at an appropriate time.

The server 10 of the service provider comprises a data sending and a receiving module (requester-part sending means) 11 for sending and receiving data to and from the customer terminal 30 and the supplier terminal 40 over the network 20, an authentication module 12, a customer request processing module 13, a supplier request processing module 14, a search execution module (search processing module, information retrieval means) 15, an image generator 16, a data controller 18, an account database (account DB in FIG. 2) 19A for storing account information registered beforehand for a customer and a store, a commodity database (commodity DB in FIG. 2, database, information storage means) 19B for storing information about commodities (exhibition information, information, information-to-be-searched-for), which are uploaded from the supplier terminal 40, and a session-specific database (session-specific DB in FIG. 2, information storage, search criteria storage, additional information storage means) 19C for storing session-specific data for providing a consistent session to the same user.

When the authentication module 12 is accessed by a user terminal 30 or supplier terminal 40, it determines whether the terminal is a registered customer terminal 30 or supplier terminal 40. The customer request processing module 13 performs a predetermined process according to a request received from the customer terminal 30. The supplier request processing module 14 receives a request sent from the supplier terminal 40 and performs a predetermined process.

The search execution module 15 receives search criteria input from the customer terminal 30, searches through data stored in the commodity database 19B to retrieve commodity information that meets the search criteria and outputs it as search result information (the retrieved information) as will be described later. The image generator 16 generates and outputs image data (display data) to be displayed on a browser screen of the customer terminal 30 or the supplier terminal 40 based on the processing result of the customer request processing module 13 and the supplier request processing module 14.

The data controller 18 controls the input/output of data into/from the commodity database 19B and the session-specific database 19C according to processes performed on the customer terminal 30 and the supplier terminal 40.

The flow of process performed by a customer in a used-car search system configured as described above in order to consider purchasing a used car will be described below, while further describing the function of each of the components described above.

First, a supplier uses a supplier terminal 40 to perform in advance a process for registering a login ID and password specified by the supplier for use during login to a server 10, as well as identification information such as an identifier for identifying the supplier, and information about the supplier, such as the store name, address, telephone number, and e-mail address of the supplier. The registered information is stored in an account database 19A in the server 10.

The supplier uploads data about commodities from the data storage 44 of the supplier terminal 40 to the server 10 over a network 20 at an appropriate time to exhibit the commodities. The information about a commodity may include the manufacturer name, model name (type), grade, model year, color, price, image (photograph), number of miles driven, car inspection date, included options, state of the commodity, and other information such as messages about selling points of the commodity. At this time, when the supplier uses the login ID and password previously registered from the supplier terminal 40 to make login to the server 10, at the side of the server 10 the data controller 18 as specifying means reference the information stored in the account database 19A to identify the supplier exhibiting the commodities.

In the server 10, which received commodity information from the supplier terminal 40, a data controller 18 associates the information with identification information identifying the supplier identified during the login and stores it in a commodity database 19B.

Figure 3:
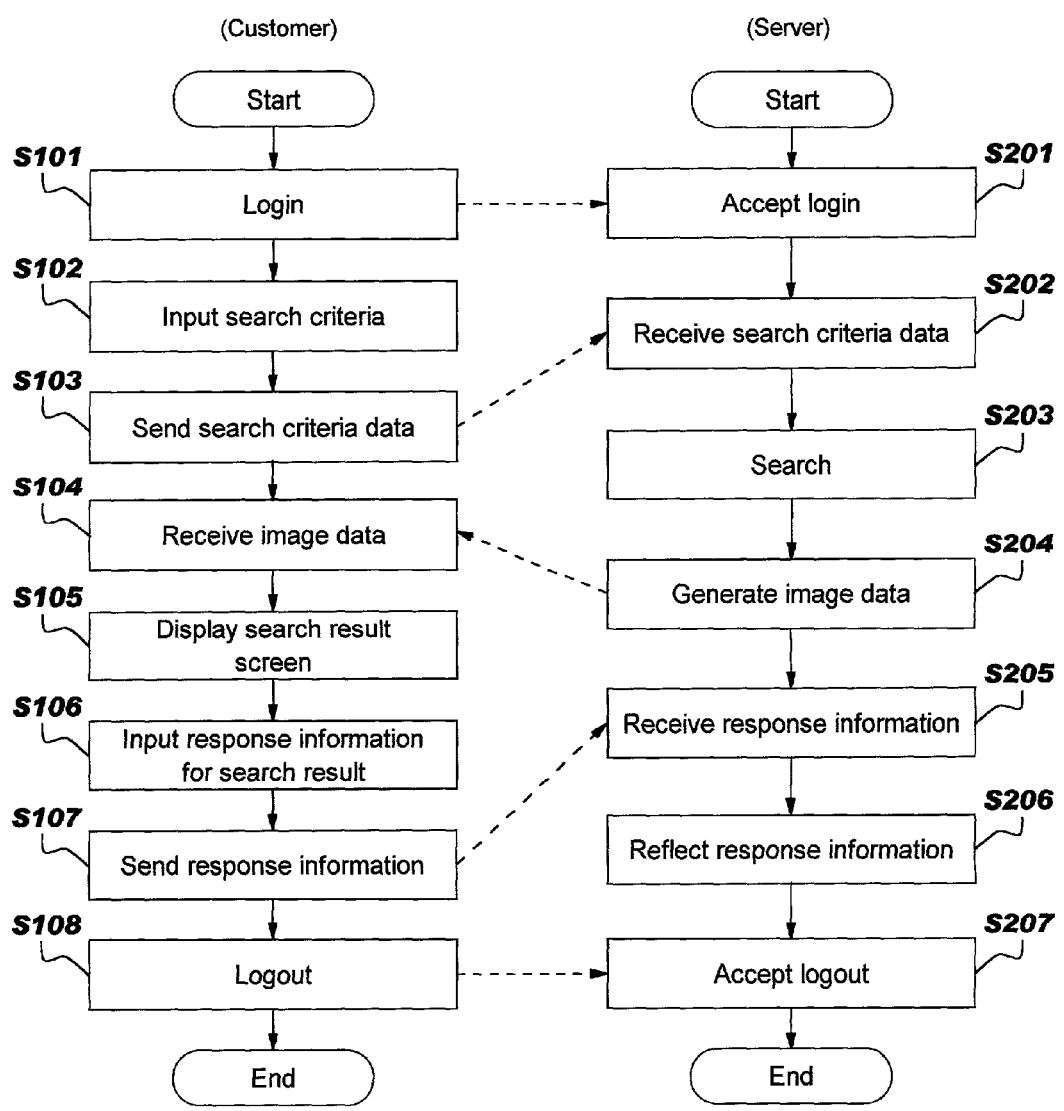
FIG. 3 shows a flow of a process performed by a customer in a first session.

As shown in FIG. 3, a customer uses a customer terminal 30 to access the server 10 over the network 20 and, if it is the first access, specifies a login ID and a password as requester terminal identification information and requester identification information, or if the second or subsequent access, uses a login ID and password already specified to login to the server 10 (step S101).

In the server 10, an authentication module 12 performs an authentication process to accept the login, then a data sending/receiving module 11 sends screen data for prompting the customer to enter search criteria as the initial screen for performing a used-car search (step S201). In this way, when the server 10 accepts the login from the customer terminal 30 and a session is established between the server 10 and the customer terminal 30, the data controller 18 of the server 10 generates a session ID (session-specific information, customer identification information) specific to the session, associates it with the login ID of the customer terminal 30, and stores the session ID associated with the login ID in the session-specific database 19C. The session ID may be any digit or character string, the login ID as is, or a screen number used in the session.

The customer terminal 30 receives this data at the data sending/receiving module 31 over the network 20 and displays a screen based on the received data on the display 32. A selection display for a customer to specify a manufacture name, model name (type), grade, model year, color, price range and the like as search criteria appears on this screen. The customer uses the input module 33 such as a mouse and keyboard to input desired search criteria (step S102). After the completion of the specification of the search criteria, the user operates a control such as a command button displayed on the screen for executing the search by using the input module 33. Then the specified search criteria data is sent out through the data sending/receiving module 31 from the customer terminal 30 (step S103). The process at steps S101 through S103 is similar to that performed on screens for specifying search criteria on the Internet, which are well known.

The search criteria data provided through the network 20 is received by the data sending/receiving module 11 in the server 10 (step S202). The customer request processing module 13 receives from the data sending/receiving module 11 an indication indicating that the search criteria data is received and instructs the search execution module 15 to execute the search. The search execution module 15 receives the instruction and searches through data stored in the commodity database 19B based on the received search criteria to retrieve information about commodities that meet the search criteria (step S203). Then the data controller 18 associates the "search criteria" data and "commodity identification information" about the retrieved commodities with "session-specific information" such as the above-described session ID and stores these items of information in the session-specific database 19C.

Figure 4:
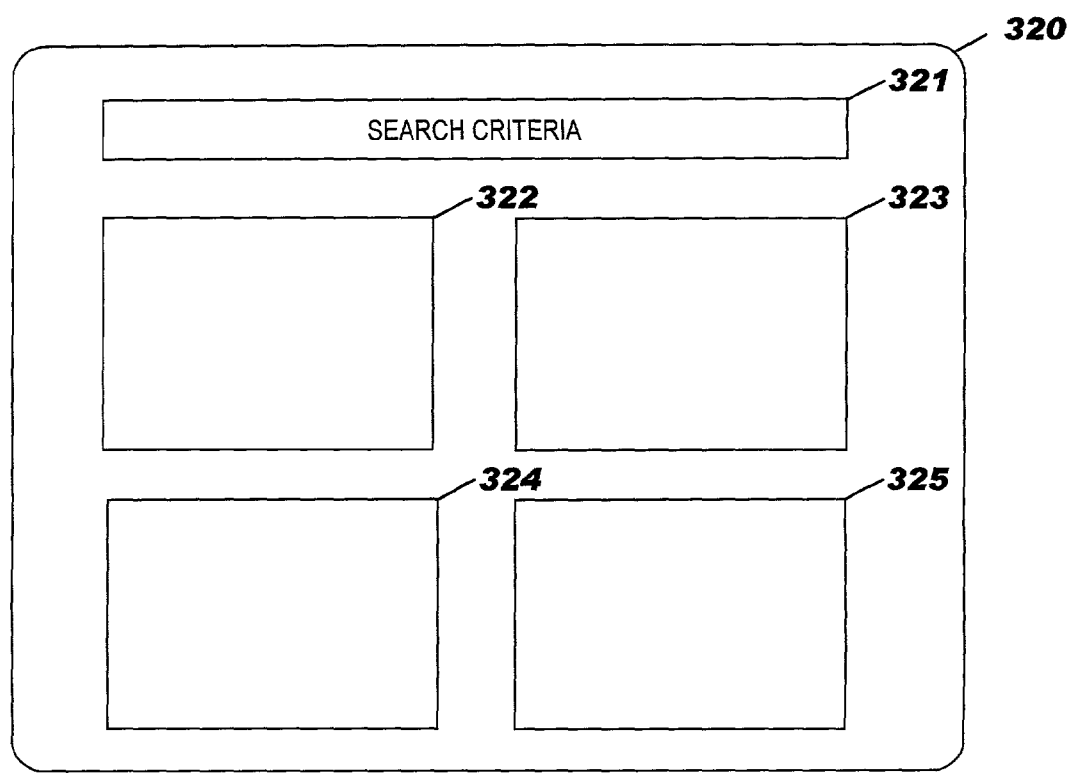
FIG. 4 shows an example of a search result screen displayed on a customer terminal.

The information about commodities retrieved by the search in the search execution module 15 may include a manufacturer name, model name (type), grade, model year, color (of car body), price, commodity image (photograph) as mentioned above. The image generator 16 generates an image of this information to be displayed on the display 32 of the customer terminal 30 as the search result. For example, the search criteria 321 provided by the customer and data about commodities are displayed in generally rectangular card-like display areas 322–325, on the screen 320 displayed on the display 32, as shown in FIG. 4. These display areas 322–325 are disposed in a predetermined arrangement. A supplier name, information about the maker name, model (type), grade, model year, and color of a commodity, information about the price of the commodity, and the image (photograph) of the commodity may be displayed in each of the display areas 322–325. After automatically generating the data on the screen 320 as shown in FIG. 4 based on the commodity information retrieved from the commodity database 19B, the image generator sends the data through the data sending/receiving module 11 (step S204).

In the customer terminal 30, the data sending/receiving module 31 receives the data sent from the server 10 over the network 20 (step S104) and the display 32 displays the screen 320 shown in FIG. 4 based on the received data as search results (step S105). The display areas 322–325 for presenting information about individual commodities are displayed on the display 32 based on position coordinates predetermined in the image generator 16 of the server 10. The customer can change the arrangement of the display areas 322–325 presenting the information about individual commodities appropriately by an operation such as dragging.

The customer views the search results displayed on the screen 320 narrows the commodity search and inputs a message such as an inquiry or request. For example, the user can input a checkmark in a checkbox provided in each of the display areas 322–325 as an indication of excluding the information in that area from information to be found by using the input module 33 to exclude the information when the next and subsequent searches are performed. The user can enter a message such as an inquiry or request to the supplier of each commodity in a message field provided in each of the display areas 322–325 by typing text through the input module 33.

The checkmark input in the checkbox and the message data input in the message field in this way and the position coordinates indicating the position of the display areas 322–325 are sent out from the data sending/receiving module 31 as "response information", which is additional information added to the search results, that is, requester's additional information (step S106 through S107).

Figure 5:
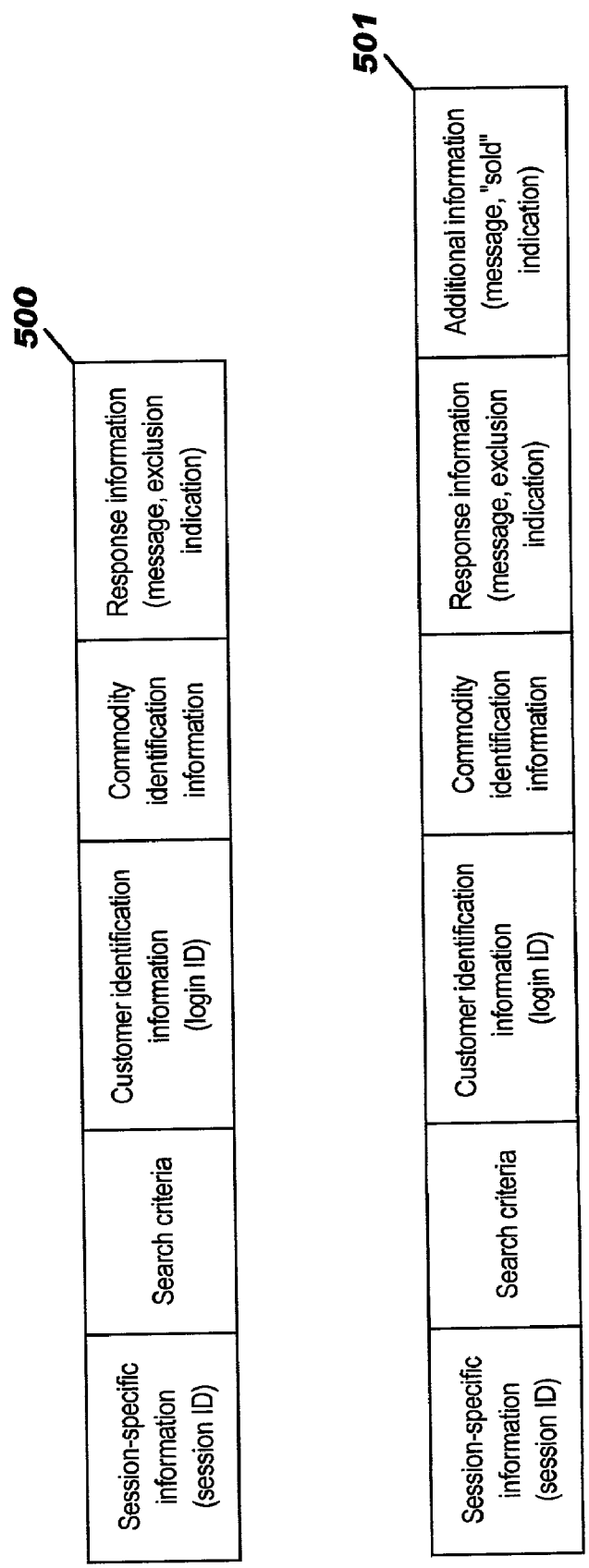
FIG. 5 shows information associated with a session ID on a supplier terminal.

The data sending/receiving module 11 in the serve 10 receives the response information over the network 20 (step S205). In the server 10, the data controller 18 acts as a message reception module, specific information adding module, and additional information reception module to associate the received "replay information" with "session-specific information" and "commodity identification information" to which the "response information" is added and store these items of information in the session-specific database 19C. In this way, the received response information is reflected in the subsequent process. At this time point, "response information", "session-specific information", "customer identification information" consisting of a checkmark and messages provided by the customer, "commodity identification information", and "search criteria" are associated with each other and stored (step S206), for example according to the exemplary record structures 500, 501 of FIG. 5.

Subsequently, when the customer performs a predetermined logout operation on the customer terminal 30 (step S108), the server 10 receives the logout command over the network 20, accepts the logout, and performs a logout process to complete the session (step S207).

A process flow will be described below in which a supplier (supplier B, for example) providing commodities which the customer left as candidates for purchase (commodities displayed on the screen 320 and for which no checkmark for deletion is input in the checkbox in FIG. 4) after the customer performs the search on the customer terminal 30 accesses the server 10.

Figure 6:
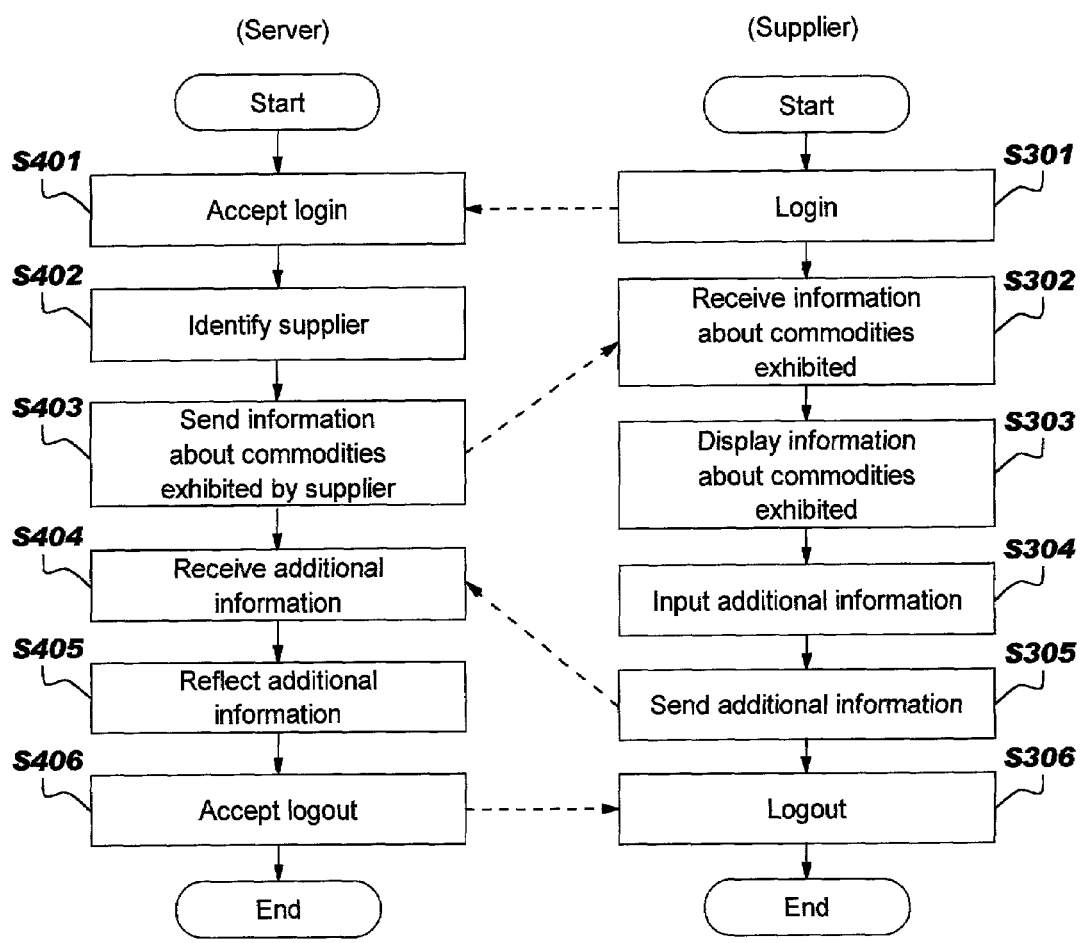
FIG. 6 shows a flow of a process performed on the supplier terminal.

As shown in FIG. 6, in order for supplier B to access the server 10, supplier B first inputs a login ID and password on a supplier terminal 40 to login to the server 10 (step S301).

Then the authentication module 12 in the server 10 performs an authentication process to accept the login (step S401) and identifies the supplier based on the accepted login ID (step S402).

Then, the data controller 18, acting as a message output module and information output module, retrieves, from the commodity database 19B, data about the commodities associated with the identification information about identified supplier B, that is, data about the commodities exhibited by supplier B. The data controller 18 uses "commodity identification information" about the retrieved commodities as a key to retrieve "session-specific information" and "replay information" associated with the "commodity identification information" from the session-specific database 19C. Then the data sending/receiving module 11 sends the retrieved data as information (exhibition list) about the commodities exhibited by supplier B in predetermined format (step S403).

In the supplier terminal 40, a data sending/receiving module 41 receives this information over the network 20 and a display 42 displays an image based on the received data (steps S302, S303). FIG. 7 shows an example of a screen 420 displayed on the display 42. In FIG. 7, checkmarks 421–423 entered in the following process are shown.

As shown in FIG. 7, a list of commodities about which data is uploaded to the commodity database 19B of the server 10 by supplier B is displayed on the screen 420 as an exhibition list of supplier B (search result information including information that is provided from the supplier terminal 40 and to be searched for), base on the data retrieved from the commodity database 19B of the server 10. Information such as an information indicating whether there is an intending purchaser or not (apparent from the presence of "session-specific information") and a message input by the customer is also displayed for each commodity based on "replay information" retrieved from the session-specific database 19C. A display similar to the screen 320 displayed on the customer terminal 30 may be displayed on the supplier terminal 40 and messages input by the customer may be displayed on the screen. In such a case, display areas 322–325 presenting information about individual commodities are disposed based on position coordinates included in the "response information".

Also provided on the screen 420 are a message checkbox 421 and a "sold" label checkbox 423 for "sold" for inputting response message information, additional information, supplier's additional information, and provider's additional information for each commodity. The supplier can input a checkmark into the message checkbox 422 to input a message to the customer of the commodity into an input area (not shown) on this screen 420 or in a popup window based on "session-specific information" associated with the selected commodity through the input module 43. When "additional information" comprising checkmarks and messages is input (step S304), the data sending/receiving module 41 associates and sends the "additional information" with the "session-specific information" received from the server 10 at step S302 (step S305).

When the data sending/receiving module 11 of the serve 10 receives the "session-specific information" and "additional information" (step S404), the data controller 18 uses the "session-specific information" as a key to associate the "additional information" with the same "session-sensitive information" previously stored in the session-specific database 19C and stores it. Thus, the "additional information" input on the supplier terminal 40 is reflected in the session-specific database 19C for example according to the record structure 501 shown in FIG. 5 (step S405).

When the supplier subsequently performs a predetermined logout operation on the supplier terminal 40 (step S306), the server 10 receives the logout command over the network 20, accepts the logout, and performs a logout process (step S406).

A process flow in which the customer accesses the server 10 through the customer terminal 30 after the additional information is input from the supplier as described above will be described below with reference to FIG. 8.

Figure 8:
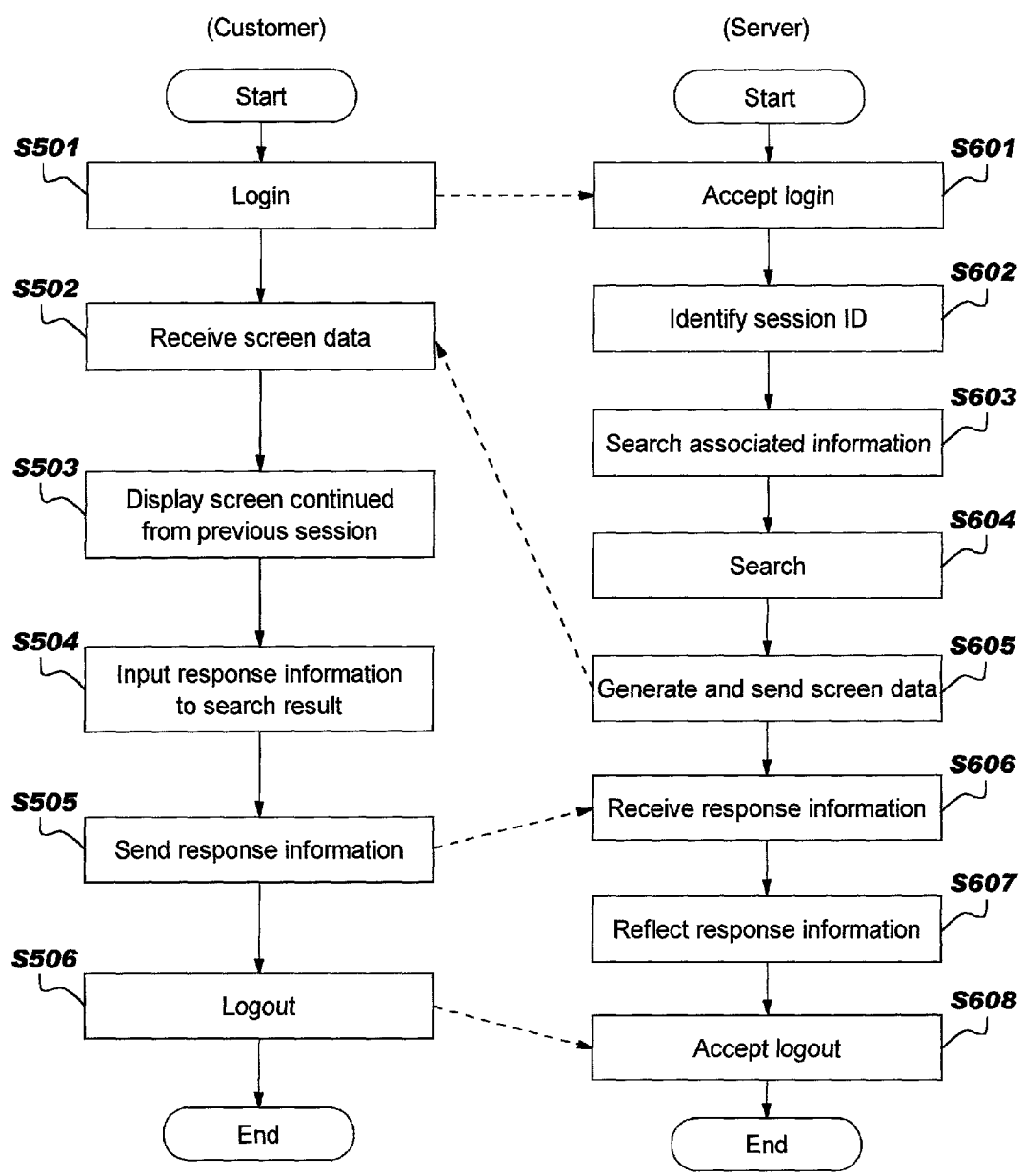
FIG. 8 shows a flow of a process performed by the customer in a second and subsequent sessions.

As shown in FIG. 8, the customer uses the customer terminal 30 to access the server 10 thorough the network 20 and uses the login ID and password to login to the server 10 (step S501). Then in the server 10, the authentication module 12 performs an authentication process to accept the login (step S601) and the data controller 18 identifies "session-specific information" from among data in the session-specific database 19C based on the login ID, which is "customer identification information" (step S602). The data controller 18 acting as an information output module and response message output module retrieves "search criteria", "commodity identification information", "response information", and "additional information" associated with each other from the session-specific database 19C (step S603).

Then, the search execution module 15 in the server 10 searches for data stored in the commodity database 19B based on the "search criteria" retrieved at step S603, that is the same criteria used in the previous access, to retrieve information about commodities that meet the search criteria (step S604).

The search execution module 15 then references the "commodity identification information" retrieved at step S603 to determine whether each of the commodities retrieved at step S604 is contained in the "commodity identification information". If it is not contained in the "commodity identification information", the search execution module 15 adds "accent information", such as "New", which indicates that the commodity has not been retrieved previously, to that commodity. On the other hand, if it is contained in the "commodity identification information", the search execution module 15 references the "response information" and "additional information" and adds data about a commodity marked with a checkmark for exclusion and messages input by the customer and the supplier in the previous session to the information about that commodity.

The commodity with a checkmark for exclusion is excluded from the retrieved commodity.

Then the image generator 16 generates image data for displaying this information on the display 32 of the customer terminal 30 and sends out through the data sending/receiving module 11 (step S605).

Figure 9:
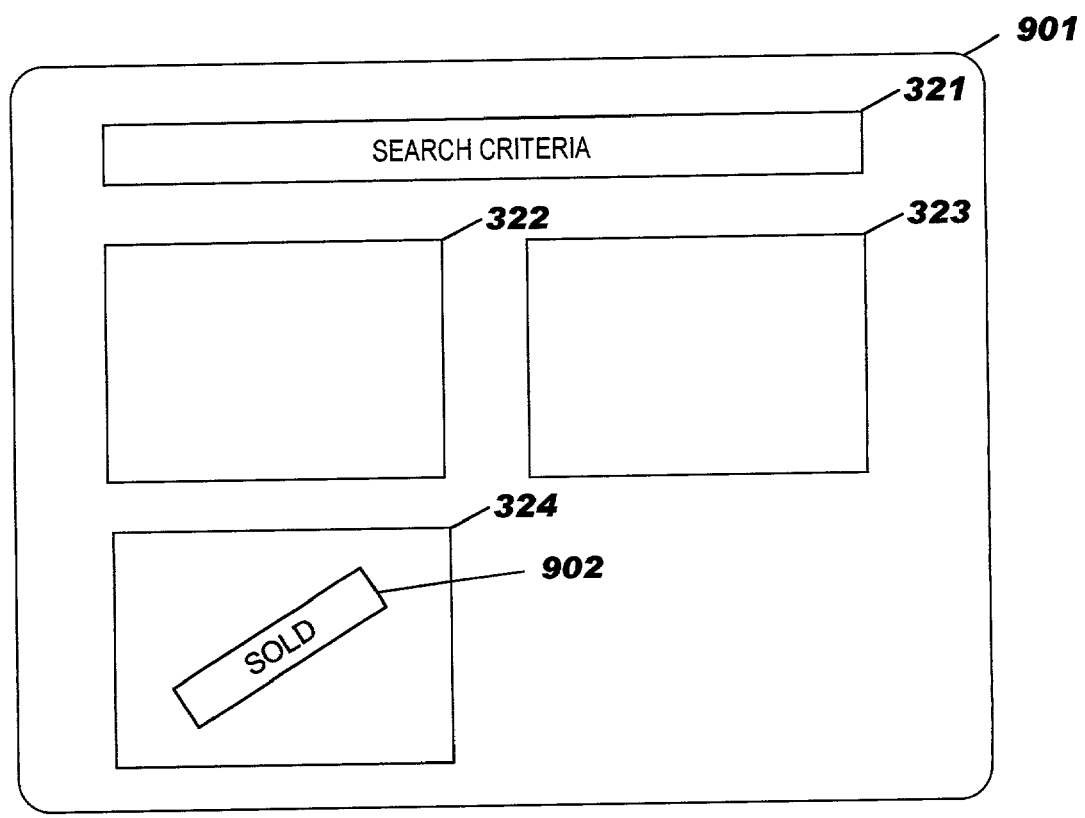
FIG. 9 shows an example of a search result screen displayed on the customer terminal in the second and subsequent sessions.

In the customer terminal 30, the data sending/receiving module 31 receives the data sent from the server 10 over the network 20 (step S502) and the display 32 displays a screen 901 based on the received data as shown in FIG. 9 (step S503). Displayed on the screen 901 shown in FIG. 9 is information continued from the previous session, which is search result information in which supplier's additional information is reflected and information to be searched for, excluding information to which an indication indicating that it is to be excluded from search scope is added. That is, through the process in step S605 compared with the image resulting from the previous module as shown in FIG. 4, commodities removed are not displayed, commodities to which discount information were added by the supplier are displayed with discount price information, and commodities to which "sold" information were added are displayed with a label 902, "SOLD", indicating that they have been sold, for example, on the screen 901. Display areas 322–324 presenting information about individual commodities are disposed based on position coordinates included in the "response information".

Figure 10:
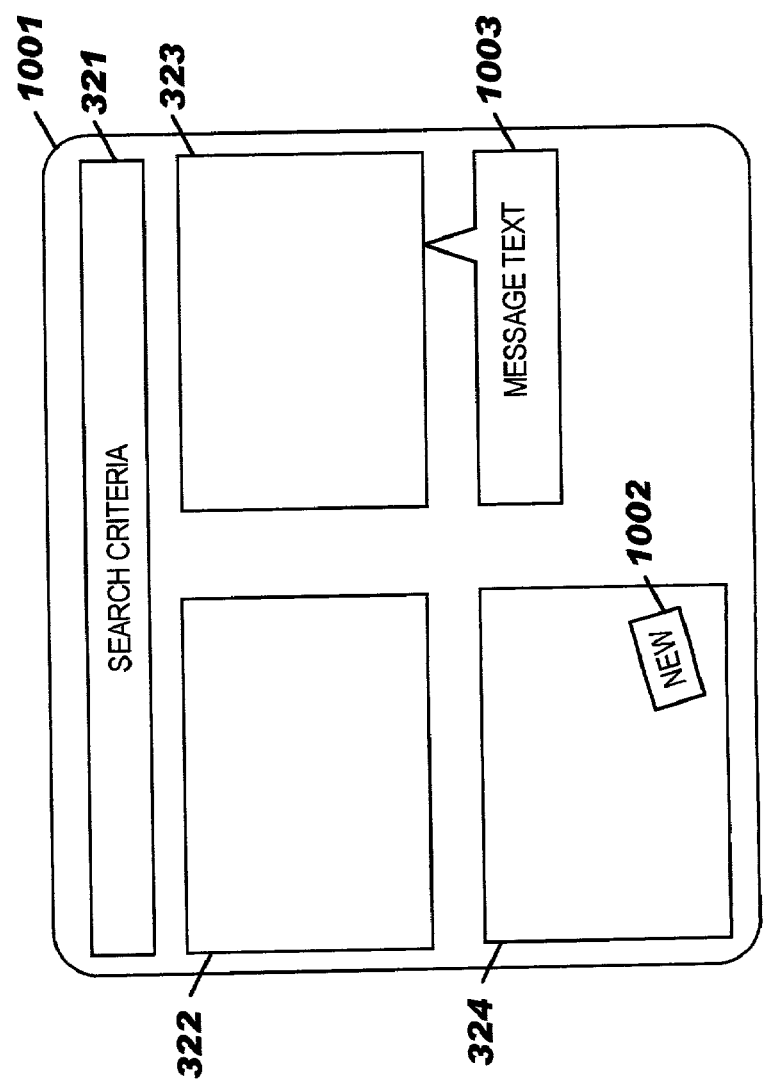
FIG. 10 shows another example of the search result screen displayed on the customer terminal in the second and subsequent sessions.

In another example, a screen 1001, shown in FIG. 10, commodities newly added after the previous session are displayed with "accent" information 1002, "New", and commodities for which a message is entered by the supplier are displayed with message text in a message display sub-area 1003.

The customer views the search result information displayed on the screens 401 or 1001 to narrow the commodity search and input a "response information" such as an inquiry or request through the input module 33 as in the previous session (step S504). This data is sent out from the data sending/receiving module 31 (step S505).

The data sending/receiving module 11 in the server 10 receives the response information over the network 20 (step S606) and the data controller 18 associates the received "response information" with "session-specific information", "commodity identification information", and "search criteria" and stores the information in the session-specific database 19C. In this way the received response information is reflected in the data in the server 10 (step S607).

Then the customer performs a predetermined logout operation on the customer terminal 30 (step S506) and the server 10 accepts the logout to end the session (step S608).

As described above, commodities with data held in the commodity database 19B are searched based on search criteria input on the customer terminal 30 to retrieve commodities, and "response information" such as an exclusion checkmark and message is added to the retrieved commodities through the customer terminal 30, "additional information" is also added to the retrieved commodities through the supplier terminal 40, and the "response information" and "additional information" are associated with and stored with "session-specific information" in the session-specific database 19C. Thus, commodities marked with an exclusion checkmark will not be retrieved in the subsequent sessions and, unlike methods of the prior art, the same commodities would not be retrieved repeatedly even if the same search criteria were used. In addition, the customer can provide a message ("response information") for a commodity through the customer terminal 30 and receive "additional information" such as a message provided from a supplier terminal 40 in response to the "response information" and therefore can negotiate with the supplier exclusively on the service site provided by the server 10 without the help of e-mail or telephone and without the need for contacting individual suppliers separately. Thus the customer can continue the search and negotiations by using the service provided by the server 10. The supplier can response to a message from a customer to negotiate with him/her simply by performing the process illustrated at steps S301 through S306 in FIG. 6. Therefore it is not necessary for the supplier to handle irregular calls from customers or write e-mail to the customers, resulting in a higher efficiency of the business.

Figure 12:
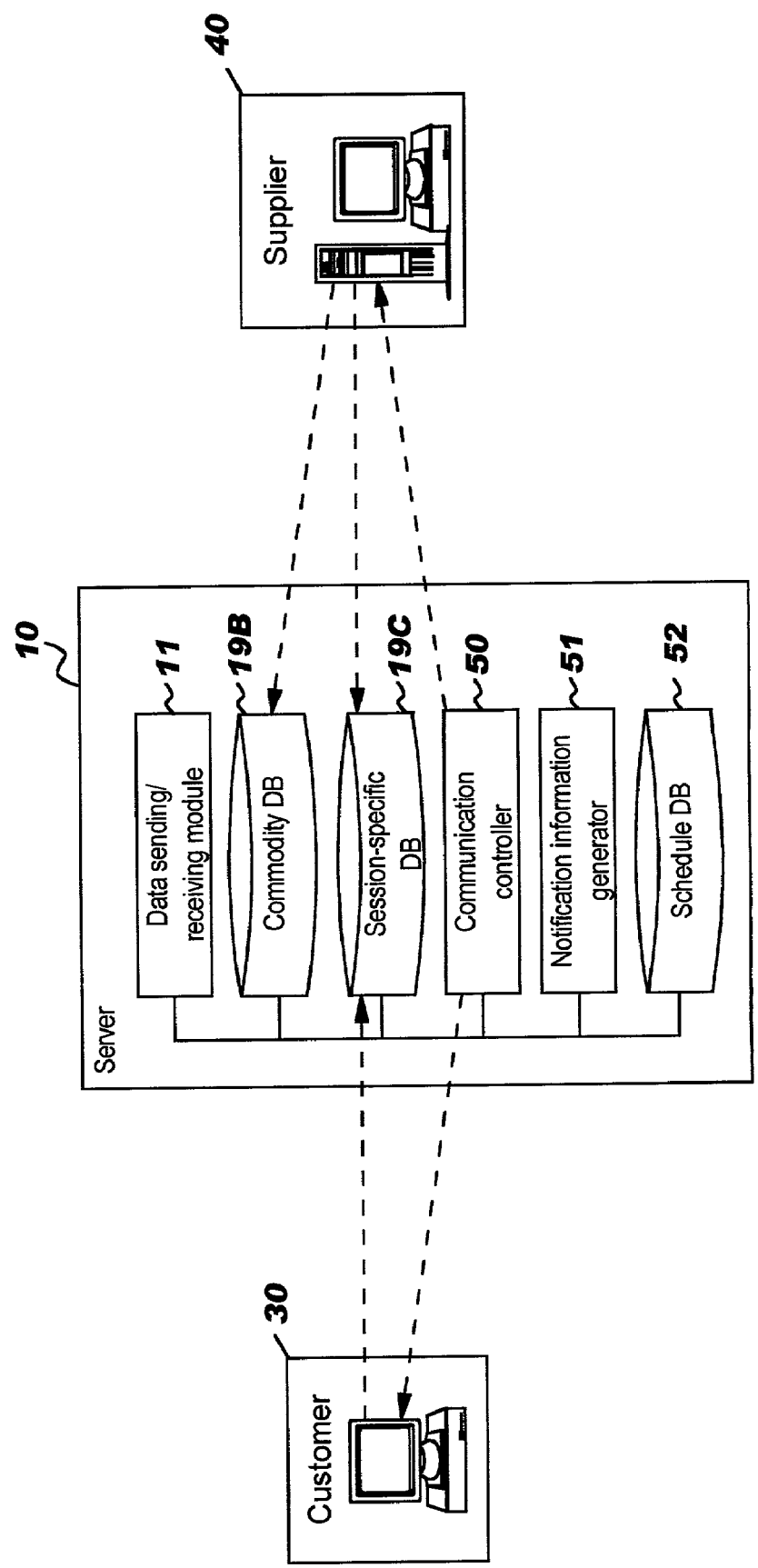
FIG. 12 shows a configuration in which update notification is provided.

The server 10 as described above may employ a configuration in which a customer and supplier are notified of an update to information at an appropriate time. FIG. 12 shows an example of a server 10 having such an arrangement. In FIG. 12, the minimum components required for the notification of an information update are extracted and shown from the configuration of the server 10 shown in FIG. 2 and the rest of the configuration is omitted from FIG. 12.

As shown in FIG. 12, the server 10 comprises a notification controller 50 for controlling update notification to customers and suppliers, a notification information generator 51 for generating messages during notification, and a schedule DB 52 for storing information provided by the customers and suppliers for the timing of notification, in addition to the components shown in FIG. 2.

The customers and suppliers can previously set the timing of determining whether information is updated or not (the timing of notification). The set timing information is stored in the schedule DB 52. That is, the times of accessing the server 10 from a customer terminal 30 or a supplier terminal 40 through a network 20 for the determination may be for example, "at xx o'clock everyday", "at HH o'clock on the same day every week", or "at xx o'clock on the same day every month". The timing may also be set as "when information is updated".

The notification controller 50 references a commodity DB 19B and session-specific DB 19C with the timing set in the schedule DB 52 to determine whether information has been updated after every notification or after the last access from the customer terminal 30 or the supplier terminal 40. If the information in the session-specific DB 19C has been updated by the addition of "response information" such as a message performed by the customer through a process as described above, the supplier terminal 40 is notified of the update through the network 20. Similarly, the notification controller 50 notifies the customer terminal 30 of an update through the network 20 if information in the session-specific DB 19C is updated by the addition of "additional information" such as a message through a process performed by the supplier. In addition, the notification controller 50 notifies the customer terminal 30 of an update through the network 20 if information in a commodity DB 19B, which is retrieved by a search based on "search criteria" specified by the customer, is changed by the deletion of information about a sold commodity or the addition of information about a new commodity performed by an additional supplier.

The notification information generator 51 checks and sees the change and generates a message according to the change when notifying the customer terminal 30 or supplier terminal 40 of the change. For example, if a supplier provides "additional information", it generates a message, "Supplier B reduced the price of PQRS from AAAA from ¥2,700,000 to ¥2,550,000 at 16:00 on May 12." or, if a commodity to be retrieved by a search performed based on "search criteria"

specified by the customer is added, it generates a message, "Search results for newly available commodities: 20 items."

The message thus generated by the notification information generator 51 is provided to the customer or supplier in the form of facsimile, voice information, or e-mail. For example, if the notification information generator 51 provides the message by facsimile, it generates facsimile image data containing the message in a predetermined format. Then the notification controller 50 sends the image data from a data sending/receiving module 11 to the facsimile machine of the customer or supplier, the facsimile number of which is pre-registered in the server 10, through an external server (not shown) for notification to provide the message. If the message is provided by voice information, the notification information generator 51 generates voice data based on the message and the notification controller 50 sends it from the data sending/receiving module 11 to the telephone of the customer or supplier, the telephone number of which is pre-registered, through the external server (not shown) for notification. In the latter case, the voice data may be sent to the terminal 30 of the customer or the terminal 40 of the supplier, rather than the telephone, to cause the customer terminal 30 or supplier terminal 40 to reproduce the voice message based on the voice data to provide the message. If e-mail is used, the notification information generator 51 generates e-mail data containing the message text in a predetermined format and the notification controller 50 sends it from the data sending/receiving module 11 to the customer terminal 30 or supplier terminal 40, the e-mail address of which is pre-registered, through an external mail server (not shown).

While the supplier displays an exhibition list as shown in FIG. 7 on a screen 420 in the embodiment described above, the present invention is not limited to that configuration. A screen similar to the screen 320 displayed on the customer terminal 30 shown in FIG. 4 may be displayed on the supplier terminal 40.

In such a case, the supplier terminal 40, a particular commodity is selected on the screen 420 shown in FIG. 7 and, if necessary, "session-specific information" having that commodity left as a candidate is selected. Then the data sending/receiving module 41 transfers the "session-specific information" to the server 10.

The server 10 receives the information, performs the process illustrated at steps S603 through S605 in FIG. 8, uses the provided "session-specific information" as a key to retrieve "search criteria", "commodity identification information", "response searches for data from the session-specific database 19C, searches for data based on the "search criteria" and information about commodities that meet the search criteria used in the previous session to retrieve it, make reference to the "commodity identification information" and "response information", and displays an image in which a commodity marked with a checkmark for exclusion and messages input by the customer in the previous session.

Thus the supplier can view a list of commodities left as candidates by the customer (information about all commodities retrieved by the customer) and therefore can present information for providing advantage to commodities made available by the supplier, such as information about discounts and optional services, depending on the conditions of other suppliers.

A checkbox is provided for controlling access to information about each commodity on the screen 420 shown in FIG. 7 so that other suppliers cannot access the information about a commodity if a checkmark is input in the checkbox for the commodity by the input module 43 of the supplier terminal 40. In particular, if a checkmark is input in the checkbox, the data controller 18 of the server 10 acts as an access right setting module to associate and store "session-specific information" and "commodity identification information" with "access control information" in the session-specific database 19C. If another supplier displays the information about a session with the "access control information", "additional information" such as a comment about a commodity with the "access control information" is not displayed. The "additional information" is displayed only on a customer terminal 30. Thus the supplier can present favorable conditions to the customer without disclosing the specific conditions to another supplier.

Figure 11:
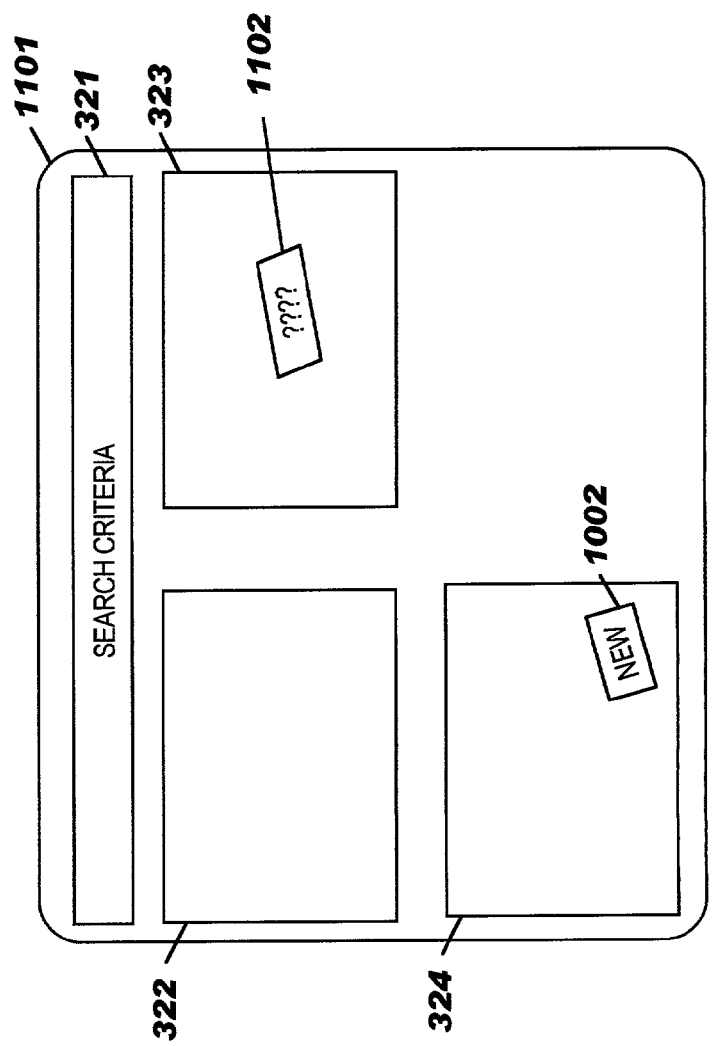
FIG. 11 shows another example of the screen that is displayed on the supplier terminal and includes information to which access control is applied.

In this case, a screen 1101 as shown in FIG. 11 may be displayed on the terminals 40 of suppliers other than the supplier that limits the access right. On the display 1101, a label like "????" or the like 1102 may be displayed in an area (display area 324, for example) on a card displaying a commodity to which "access control information" is applied. Alternatively, it is possible that only the frame of the display area 324 is displayed with its content being blanked out to indicate the presence of the commodity to which "access control information" is added, thereby allowing the other suppliers to know it.

While a commodity marked with an exclusion checkmark is removed from (not displayed on) the list on the screen 320 in the embodiment described above, other arrangements may be used. For example, an excluded commodity may be moved to another area on the screen 320. That is, the commodity is displayed distinctively from commodities that are not excluded.

While in the embodiment described above "accent information" such as "NEW" is added to a commodity that has not been retrieved yet, the newly available commodity may be displayed on an area separate from areas where existing commodities are displayed.

In addition, if a user does not access for a predetermined time period after the last access from the terminal 30 of the customer to the server 10, information (data) about the customer held in the session-specific database 19C may be deleted.

While in the embodiment described above an access control can be set on a customer terminal 30, another configuration is possible in which the access control can be set also on a supplier terminal 40. This configuration may be useful in the case where the supplier wants to provide a message to a customer without other suppliers' knowledge.

In the embodiment described above, information about a customer may be obtained, such as when the customer wants to buy a commodity, the price below which the customer would decide to buy the commodity, or credit information such as the income or records of past purchase, and priority information may be assigned to each customer based on this information. This priority information may be provided to the supplier to allow the supplier to offer a particular condition to the customer according to the priority.

While in the embodiment described above used car information is used as an example for commodity information to be searched for, the present invention is not limited to this application. Rather, the present invention can be applied to any other goods or services. For example, "personal computers" can be searched for by using a CPU, HDD capacity, memory capacity, monitor specifications, equipment such as drives, or the price as search criteria.

The service described above is not limited to goods or services for pay. It can be applied to charge-free goods, services, or information.

Other implementations are also possible. Components may be omitted from or added to the configuration described above, or various other changes and modifications may be made without departing from the spirit of the present invention.

I claim:

1. A server for storing exhibition information provided from a terminal of an exhibitor over a network and searching said exhibition information based on a first set of search criteria specified from a terminal of a customer via said network, comprising:
  a search execution module for searching exhibition information based on said first set of search criteria specified on said terminal of said customer to retrieve the exhibition information meeting said first set of search criteria and for outputting, responsive to said searching, one or more items of said exhibition information meeting said first set of search criteria to one or more display areas in a one-to-one correspondence, said one or more display areas displayed on said terminal of said customer in response to a retrieval of said exhibition information meeting said first set of search criteria, said searching and said outputting being performed during a first session between said server and said terminal of said customer;
  a data receiving module for receiving additional information provided concerning said one or more items from said terminal of said customer and for associating and storing said additional information with information for identifying said customer; and
  an information output module for outputting said additional information to said terminal of said exhibitor in response to said server being accessed from said terminal of said exhibitor after said data receiving module receives said additional information,
  wherein said additional information comprises:
    a message input in a message field included in a display area of said one or more display areas, said display area displaying a first item of said one or more items of said exhibition information meeting said first set of search criteria, said displaying said first item responsive to said outputting said one or more items, said message associated with said first item and said message to be viewed by said exhibitor via said outputting by said information output module, and
    an indicator indicating a second item of said one or more items of said exhibition information meeting said first set of search criteria, said second item output by said search execution module during said first session, and
  wherein said search execution module is for excluding said second item indicated by said indicator from being output to said terminal of said customer in response to said search execution module searching said exhibition information based on a second set of search criteria during a second session between said server and said terminal of said customer, said second set of search criteria being identical to said first set of search criteria, and said second session being subsequent to said first session.

2. The server according to claim 1, further comprising:
  a response message reception module for receiving response message information input from said terminal of said exhibitor responding to said message of said additional information output from said information output module; and
  a response message output module for outputting said response message information associated with said information for identifying said customer to said terminal of said customer in response to said server being accessed by said terminal of said customer by using said information for identifying said customer after said response message information is received.

3. A server for storing information provided from a terminal of an information provider over a network and searching said information based on search criteria specified from a terminal of an information requester over a network, comprising:
  an information adding module for adding session-specific information to a first session established between said terminal of said information requester and said server in response to a first set of search criteria being specified from said terminal of said information requester;
  a search execution module for searching information based on the first set of search criteria specified from said terminal of said information requester to retrieve information meeting said first set of search criteria and for outputting one or more items of said information meeting said first set of search criteria to one or more display areas in a one-to-one correspondence, said one or more display areas displayed on said terminal of said information requester in response to said searching, said searching and said outputting being performed during a first session established between said server and said terminal of said information requester;
  an information storage for receiving additional information concerning said one or more items to be added to said retrieved information meeting said first set of search criteria from at least one of said terminal of said information requester and said terminal of said information provider and for associating and storing said additional information with said session-specific information; and
  an information output module for obtaining said additional information and said retrieved information meeting said first set of search criteria to which said additional information is added based on said session-specific information from said information storage, and for outputting said additional information and said retrieved information meeting said first set of search criteria to said terminal of said information requester or said terminal of said information provider in response to a subsequent session being established between said terminal of said information requester or said terminal of said information provider and said server after said additional information is stored,
  wherein said additional information received from said terminal of said information provider comprises:
    a message input in a message field included in a display area of said one or more display areas, said display area displaying a first item of said one or more items of said retrieved information meeting said first set of search criteria, said displaying said first item responsive to said outputting by said search execution module during said first session, said message associated with said first item, and said message to be viewed by said information provider via said subsequent session established between said terminal of said information provider and said server, and
    an indicator indicating a second item of said one or more item of said retrieved information meeting said first set of search criteria, said second item being output via said search execution module during said first session, and wherein said search execution module is further for excluding said second item indicated by said indicator from being output to said terminal of said information requester in response to said search execution module searching said information based on a second set of search criteria during a second session established between said server and said terminal of said information requester, said second set of search criteria being identical to said first set of search criteria, and said second session being subsequent to said first session.

4. The server according to claim 3, further comprising a search criteria storage for associating and storing data about said search criteria specified from said terminal of said information requester with said session-specific information, wherein said search execution module retrieves information based on said search criteria the data about which is stored in said search criteria storage in response to a session being established between said terminal of said information requester and said server after the data about said search criteria is stored.

5. The server according to claim 3, wherein:
said information storage associates and stores requester terminal identification information identifying said terminal of said information requester with said session-specific information; and
said information output module obtains said session-specific information based on said requester terminal identification information obtained in response to said terminal of said information requester accessing said server.

6. A search system for searching for information based on search criteria specified from a terminal of a user accessing said search system through a network, comprising:
a database for storing information-to-be-searched-for;
a search processing module for retrieving information that is to be searched for and meets a first set of search criteria specified from said terminal of said user and for outputting, responsive to said retrieving, one or more items of said retrieved information as a search result to one or more display areas in a one-to-one correspondence, said one or more display areas displayed on said terminal of said user through said network, said retrieving and said outputting being performed during a first session established between said terminal of said user and said search system;
an additional-information receiving module for receiving additional information added to said output search result on said terminal of said user, said additional information associated with said one or more items; and
an information storage for associating and storing said first set of search criteria with said additional information, wherein information about said first set of search criteria and said additional information are retrieved from said information storage, a search is executed based on said first set of search criteria in said search execution module, and search result information in which said additional information is reflected is output in response to a second session and subsequent sessions being established between said terminal of said user and said search system,
wherein said additional information comprises:
a message input in a message field included in a display area of said one or more display areas, said display area displaying a first item of said one or more items of said retrieved information, said displaying said first item responsive to said outputting said one or more items, said message associated with said item, and
an indicator indicating a second item of said one or more items of said retrieved information, said second item output by said search processing module, and
wherein said search processing module is for excluding said second item indicated by said indicator from being output to said terminal of said user in response to said search processing module retrieving said information that meets a second set of search criteria during a second session established between said terminal of said user and said search system, said second set of search criteria being identical to said first set of search criteria, and said second session being subsequent to said first session.

7. The search system according to claim 6, wherein said search result information including said information-to-be-searched-for provided from a terminal of a supplier is output to said terminal of said supplier supplying the information-to-be-searched-for stored in said database.

8. The search system according to claim 7, wherein supplier additional information added by said terminal of said supplier to said search result information output to said terminal of said supplier is received; and
a search is executed based on said search criteria in said search processing module and search result information in which said additional information and said supplier additional information are reflected are output in response to a session being established between said terminal of said user or said terminal of said supplier after said supplier additional information is received.

9. An information-providing system, comprising:
a server connectable to a network;
a terminal of an information provider, said terminal connectable to said network for providing information to said server,
wherein said server comprises:
an information storage for storing information provided from said terminal of said information provider;
an information retrieval module for retrieving information from the information stored in said information storage based on a first set of search criteria included in a first request sent from a terminal of an external information requester over said network;
a requester-part sending module for sending one or more items of said retrieved information to one or more display areas in a one-to-one correspondence, said one or more display areas displayed on said terminal of said information requester in response to said retrieving said information based on said first set of search criteria, said retrieving by said information retrieval module and said sending by said requester-part sending module being performed during a first session established between said terminal of said information requester and said server;
an identification module for identifying said terminal or said information provider providing said information sent to said terminal of said information requester;
a provider-part sending module for sending said information retrieved by said information retrieval module to said identified terminal of said information provider, in response to said server being accessed from said terminal of said information provider after said information retrieval module retrieves said information based on said first set of search criteria; and an additional information storage for receiving requester additional information added through said terminal of said information requester to said information sent to said terminal of said information requester and for associating and storing said requester additional information with said information, wherein said provider-part sending module sends said requester additional information along with said information to said identified terminal of said information provider, wherein said requester additional information comprises:

a message input in a message field included in a display area of said one or more display areas, said display area displaying a first item of said one or more items of said retrieved information based on said first set of search criteria, said displaying said first item responsive to said sending said one or more items by said requester-part sending module, said message associated with said first item and said message to be viewed by said information provider via said requester additional information sent by said provider-part sending module, and an indicator indicating a second item of said one or more items of said retrieved information based on said first set of search criteria, said second item sent by said requester-part sending module during said first session, and wherein said information retrieval module is further for excluding said second item indicated by said indicator from being sent to said terminal of said information requester in response to said information retrieval module retrieving from said information storage based on a second set of search criteria included in a second request from said terminal of said information requester during a second session established between said terminal of said information requester and said server, said second set of search criteria being identical to said first set of search criteria, and said second session being subsequent to said first session.

10. The information-providing system according to claim 9, said system further comprising one or more terminals of one or more other information providers in addition to said information provider, said one or more terminals connectable to said network for providing information to said server, wherein said server further comprises an additional information storage for receiving provider additional information added through said terminal of said information provider to said information sent to said terminal of said information provider and for associating and storing said provider additional information with said information, wherein said requester-part sending module sends said provider additional information along with said retrieved information to said terminal of said information requester, wherein said terminal of said information provider further comprises an access right setting module for setting an access right for said provider additional information, wherein said provider-part sending module sends said provider additional information to said one or more terminals of said one or more other information providers if said access right is not set, and wherein said provider-part sending module does not send said provider additional information to said one or more terminals of said one or more other information providers if said access right is set.

11. The information-providing system according to claim 10, wherein said provider-part sending module sends all of said retrieved information and said provider additional information if said retrieved information is provided by a plurality of information providers including said information provider and at least one of said one or more other information providers.

12. An information-providing terminal of a plurality of information-providing terminals connectable to a server through a network for providing information to said server, comprising:

an information receiving module for receiving information from said server in response to an information-providing terminal of the plurality of information-providing terminals accessing said server after said information provided from said information-providing terminal is retrieved by a search according to search criteria input from an external source to said server;

an information display for displaying one or more items of said received information in one or more display areas of said information display in a one-to-one correspondence, said displaying in response to said accessing said server by said information-providing terminal;

an access right setting module for prohibiting disclosure to other information-providing terminals of said plurality of information-providing terminals of at least some of said information provided from said information-providing terminal among said retrieved information, wherein said other information-providing terminals are authenticated as providers of said information to said server;

an information adding module far adding additional information to said information displayed on said information display; and an information sending module for sending said additional information to said server, wherein said additional information comprises:

a message input in a message field included in a display area of said one or more display areas, said display area displaying an item of said one or more items of said information retrieved by said search according to said search criteria, said displaying said item responsive to said accessing said server by said information-providing terminal, said message associated with said item and said message to be viewed by a user of said external source via said sending by said information sending module.

13. An information search method for a server to search for information stored in a database according to a request sent from a terminal of an information requester over a network, comprising the steps of:

receiving a first set of search criteria data input on said terminal of said information requester over said network during a first session established between said server and said terminal of said information requester;

searching information stored in said database to retrieve information meeting said first set of search criteria and sending, responsive to said searching, one or more items of said information meeting said first set of search criteria to the terminal of said information requester for display in one or more display areas displayed on said terminal of said information requester, said searching performed daring said first session;

receiving additional information added to said information meeting said first set of search criteria by said terminal of said information requester over the network;

associating and storing said first set of search criteria with requester identification information identifying said information requester; and, sending said information meeting said first set of search criteria along with said additional information to said terminal of said information provider, in response to said server being accessed through said network by said terminal of said information provider providing said information meeting said first set of search criteria to said database, wherein said additional information comprises:
a message to said information provider input in a message field included in a display area of said one or more display areas, said display area displaying a first item of said one or more items of said information meeting said first set of search criteria, said displaying said first item responsive to said sending, said message associated with said first item and said message to be viewed by said information provider via said sending to said terminal of said information provider, and
an indicator indicating a second item of said one or more items of information meeting said first set of search criteria, said second item sent via said sending to said terminal of said information requester, and wherein said information search method further comprises:

receiving a second set of search criteria input on said terminal of said information requester over said network during a second session established between said server and said terminal of said information requester;

searching, during said second session, information stored in said database to retrieve information meeting said second set of search criteria; and excluding said second item indicated by said indicator from being sent to said terminal of said information requester in response to said searching during said second session, wherein said second get of search criteria is identical to said first set of search criteria, and wherein said second session is subsequent to said first session.

14. A method performed by a server storing information provided from a terminal of an information provider over a network for searching said information based on search criteria specified from a terminal of an information requester through said network, comprising the steps of:

assigning unique session-specific information to a first session established between said terminal of said information requester and said server in response to a first set of search criteria being specified from said terminal of said information requester;

receiving said first set or search criteria specified from said terminal of said information requester;

searching the information stored in said server based on said first set of search criteria to retrieve information meeting said first set of search criteria;

outputting one or more items of said retrieved information meeting said first set of search criteria to one or more display areas in a one-to-one correspondence, said one or more display areas displayed on said terminal of said information requester, in response to said searching, said searching and said outputting being performed during a first session established between said server and said terminal of said information requester;

receiving additional information concerning said one or more items and added to said retrieved information by at least one of said terminal of said information requester and said terminal of said information provider;

associating and storing said additional information with said session-specific information; and, responsive to a subsequent session being established between said terminal of said information requester or said terminal of said information provider and said server after said additional information is stored, obtaining said additional information and said retrieved information to which said additional information is added based on said session-specific information, and outputting said additional information and said retrieved information to said terminal of said information requester or said terminal of said information provider, wherein said additional information received by said terminal of said information provider comprises:
a message input in a message field included in a display area of said one or more display areas, said display area displaying a first item of said one or more items of said retrieved information meeting said first set of search criteria, said displaying said first item responsive to said outputting said one or more items, said message associated with said first item and said message to be viewed by said information provider via said subsequent session established between said terminal of said information provider and said server, and
an indicator indicating a second item of said one or more items of said retrieved information meeting said first set of search criteria, said outputting comprising outputting said second item during said first session, and wherein said method further comprises:
receiving a second set of search criteria specified from said terminal of said information requester during a second session established between said server and said terminal of said information requester;

searching the information stored in said server based on said second set of search criteria to retrieve information meeting said second set of search criteria during said second session; and excluding said second item indicated by said indicator from being output to said terminal of said information requester in response to searching said information stored in said server based on said second set of search criteria during said second session, wherein said second set of search criteria is identical to said first set of search criteria, and said second session is subsequent to said first session.

15. A method performed by a server for searching for information based on search criteria specified from a terminal of a user accessing said server through a network, comprising the steps of:

retrieving information-to-be-searched-for meeting a first set of search criteria specified by said terminal of said user from a database storing information-to-be-searched-for and outputting, responsive to said retrieving, one or more items of said retrieved information as a search result to one or more display areas in a one-to-one correspondence, said one or more display areas displayed on said terminal of said user through said network, said retrieving and said outputting being performed during a first session established between said terminal of said user and said server;

receiving additional information added to said output search result by said terminal of said user;

associating and storing said first set of search criteria with said additional information;

invoking said stored search criteria information and said additional information in response to subsequent sessions being established between said terminal of said user and said server; and executing a search based on said invoked search criteria and outputting search result information in which said additional information is reflected, wherein said additional information comprises:

a message input in a message field included in a display area of said one or more display areas, said display area displaying a first item of said one or more items of said retrieved information, said displaying said first item responsive to said outputting said one or more items, said message associated with said first item, and an indicator indicating a second item of said one or more items of said retrieved information, said second item output via said outputting during said first session, and wherein said method further comprises:

retrieving information-to-be-searched-for meeting a second set of search criteria specified by said terminal of said user from a database storing information-to-be-searched-for during a second session established between said terminal of said user and said server; and excluding said second item indicated by said indicator from being output to said terminal of said user in response to said retrieving during said second session, said second set of search criteria being identical to said first set of search criteria, and said second session being subsequent to said first session.

16. An information providing method in a server receiving information from a terminal of an information provider over a network, comprising the steps of:

storing the information provided from said terminal of said information provider;

from said stored information, retrieving information meeting a first set of search criteria included in a first request sent from a terminal of an external information requester over said network;

sending one or more items of said retrieved information to one or more display areas in a one-to-one correspondence, said one or more display areas displayed on said terminal of said information requester in response to said retrieving said information meeting said first set of search criteria, said retrieving and said sending being performed during a first session established between said terminal of said information requester and said server;

identifying said terminal of said information provider providing said information sent to said terminal of said information requester; and, sending said retrieved information to said terminal of said identified terminal of said information provider in response to said server being accessed from said terminal of said information provider after said retrieving said information meeting said first set of search criteria;

receiving requester additional information added through said terminal of said information requester to said retrieved information sent to said terminal of said information requester;

associating and storing said requester additional information with said retrieved information, wherein said sending said retrieved information comprises sending said requester additional information alone with said retrieved information to said identified terminal of said information provider, wherein said requester additional information comprises:

a message input in a message field included in a display area of said one or more display areas, said display area displaying a first item of said one or more items of said retrieved information based on said first set of search criteria, said displaying said first item responsive to said sending said one or more items, said message associated with said first item and said message to be viewed by said information provider after said sending said retrieved information, and an indicator indicating a second item of said one or more items of said retrieved information meeting said first set of search criteria, said second item sent via said sending said one or more items during said first session, and wherein said method further comprises:

from said stored information, retrieving information meeting a second set of search criteria included in a second request sent from a terminal of said external information requester over said network during a second session established between said terminal of said information requester and said server; and excluding said second item indicated by said indicator from being sent to said terminal of said information requester in response to said retrieving information meeting said second set of search criteria during said second session, wherein said second set of search criteria is identical to said first set of search criteria, and said second session is subsequent to said first session.

\* \* \* \* \*

UNITED STATES PATENT AND TRADEMARK OFFICE
CERTIFICATE OF CORRECTION

PATENT NO. : 6,988,097 B2  
DATED : January 17, 2006  
INVENTOR(S) : Shirota

It is certified that error appears in the above-identified patent and that said Letters Patent is hereby corrected as shown below:

Column 20,  
Line 66, delete "daring" and insert -- during --.

Column 21,  
Line 44, delete "get" and insert -- set --.

Signed and Sealed this

Eleventh Day of April, 2006

JON W. DUDAS  
*Director of the United States Patent and Trademark Office*